Feb. 3, 1970  G. V. F. CAROLI ET AL  3,492,975

ENGINE COOLING FAN WITH THERMOSTATIC FLUID SHEAR CLUTCH

Filed Jan. 29, 1968  2 Sheets-Sheet 1

Inventors
GERHARD V.F. CAROLI
AND OTTO LUTZ
BY Robert H. Jacob
AGT.

Inventors:
GERHARD V. F. CAROLI
AND OTTO LUTZ
BY Robert H. Jacob
AGT.

United States Patent Office 3,492,975
Patented Feb. 3, 1970

3,492,975
ENGINE COOLING FAN WITH THERMOSTATIC FLUID SHEAR CLUTCH
Gerhard V. F. Caroli, Stuttgart, and Otto Lutz, Braunschweig, Germany, assignors to Suddeutsche Kuhlerfabrik Julius Fr. Behr, Stuttgart-Feuerbach, Germany
Filed Jan. 29, 1968, Ser. No. 705,592
Int. Cl. F01p 7/12, 7/02; F16d 11/00
U.S. Cl. 123—41.12                   14 Claims

ABSTRACT OF THE DISCLOSURE

The invention concerns a ventilator for cooling installations associated with internal combustion engines, particularly for automotive vehicles. This ventilator installation includes a fluid coupling or clutch where the housing and a coupling disk rotatable therein constitute the clutch, and the torque is transmitted by a liquid, and which clutch has a separating disk between the work chamber and the supply chamber which has apertures for the passage of the liquid and which includes a radial ladling tube connected with an axially disposed discharging or filling tube in the work chamber.

BACKGROUND OF THE INVENTION

The invention concerns a ventilator particularly for cooling apparatus or assemblies associated with internal combustion engines, primarily for vehicles provided with a fluid coupling or clutch, where the clutch housing or casing and a coupling or drive disk define the clutch and the torque is transmitted by a liquid, which clutch is provided with a separating disk between the power or working chamber and the supply chamber and which disk is provided with apertures for the passage of the liquid.

In internal combustion engines there exists the necessity of adapting the ventilator output to the existing operating conditions. Particularly in automotive vehicles the cooling efficiency of the cooling assembly must be sufficiently proportioned to meet also the most unfavorable operating conditions. For normal operating conditions, however, this output is generally too great and must be controlled in order to avoid cooling of the engine below normal. For this purpose it is known to render the ventilator operative and inoperative, or to connect and disconnect the ventilator by a shaft coupling, as conditions may require. In this connection the sudden starting of the ventilator which is accompanied by shocks or blows is an essential shortcoming, because it introduces a considerable shock load that is applied to all of the driving elements of the ventilator which has a disadvantageous effect on the lifetime of the V-belt, of the driving disks, of the shaft of the water pump and the like.

It is also known for keeping constant the temperature of the motor to utilize a thermostat which controls a by-pass valve, whose operation depends on the temperature of the cooling water and which is connected in the conduit of the cooling water. With a rigidly driven ventilator this is accompanied by unnecessarily high power consumption. For these reasons it has been endeavored to drive the ventilator independently of the speed or number of revolutions of the motor only at such a number of revolutions as required by the cooling of the internal combustion engine at any particular time. For this purpose it is already known to drive the ventilator with the internal combustion engine by way of fluid coupling or clutch, the liquid filling of which can be controlled. By changing the degree of filling of this clutch the rotation of the ventilator can be changed in a stepless manner of from zero to the maximum number of rotations and can be adapted to the operating conditions existing at any time. In a known clutch of this type having a rotating container a ladling tube is provided which controls the filling of the clutch.

In another known liquid or fluid clutch where a clutch housing which is partially filled with liquid constitutes one-half of the clutch and a clutch disk rotating in the housing constitutes the other half of the clutch, a separating wall is supported in the housing which separates the clutch chamber containing the clutch disk from a cooling chamber and where for controlling the quantity of flow of the liquid an adjustable valve disk is provided. By means of the valve disk the quantity of oil circulating between the work chamber and the supply chamber is choked more or less depending on the cooling air temperature. This known clutch with a valve is entirely suitable for water cooled internal combustion engines. However, for air cooled internal combustion engines it has essential shortcomings, for example, too much inertia. Beyond that a relatively high minimum number of revolutions is required so that a suitable control may become effective at all.

It is an object of the invention to construct a ventilator with a ventilator clutch in such a manner that it is better adapted to meet the requirements of actual practice than the known ventilator clutches, particularly with air cooled internal combustion engines. The control is also intended to be effective even at low minimum numbers of rotations, while the construction is to be simple and the control is safeguarded over the entire range of numbers of revolution.

SUMMARY OF THE INVENTION

In order to solve this problem it is proposed in accordance with the invention to provide in a ventilator particularly for cooling installations in internal combustion engines, particularly for automotive vehicles having a fluid clutch, where the housing of the clutch and a clutch disk rotatable therein constitute the clutch, and the torque is transmitted by a liquid, with a spacing disk between the work chamber and the supply chamber which disk is provided with apertures for the passage of the fluid, to arrange a ladling tube which is radially displaceable in the supply chamber and a discharge or filling tube in the work chamber which is axially connected with the ladling tube through the separating wall.

In this manner it is accomplished with a ladling tube known per se that the fluid layer is moved from the supply chamber to the work chamber when the clutch is connected. If the clutch is to be disconnected, the ladling tube is displaced so that the fluid level can even or balance itself between the work chamber and the supply chamber through a bore in the spacing disk, and thus the loaded working surface is reduced to an extent that the ventilator seated upon a secondary part of the clutch continues to run at a lower number of revolutions.

In accordance with a further feature of the invention a generally axially disposed control bar serves for the displacement of the ladling tube, for the operation of which a setting member is provided which depends on the temperature of the cooling agent or of the internal combustion engine. In this connection the setting member or element may be constituted by elements of expansion material, magnets, sensors or feelers of bi-metal, capillaries or the like.

The inventive concept can be materialized in different ways. In one embodiment of the invention which provides for a flow control, the separating disk between the work chamber and the supply chamber is advantageously of concave construction with respect to the work chamber. This separating disk is advantageously provided with return flow bores or apertures at or proximate the outer periphery. A particularly desirable embodiment is obtained in accordance with a further feature of the invention, if the ladling tube and the discharge or outflow are disposed in two planes displaced by an angle of 90° relative to one another. The adjustment or control of the ladling tube then is advantageously achieved if the axis of the ladling tube is disposed perpendicularly relative to the axis of the ventilator. In a preferred embodiment of the invention the discharge outlet is disposed in an axial plane or in a plane parallel thereto.

In a modified embodiment of the invention a level control is obtained. For this purpose a further development in accordance with the invention provides for the subdividing of the supply chamber by an additional separating wall into a level chamber and an actual supply chamber, and in this arrangement the ladling tube is in the supply chamber while the outlet or discharge is arranged in the level chamber. In this embodiment of the invention the working fluid is passed or conveyed by means of a ladling tube known per se from the level chamber to the supply chamber, or vice versa, depending on whether it is necessary to connect or disconnect the coupling.

In accordance with a further feature of the invention level balancing or equalizing bores are provided in the separating wall between the level chamber and the work chamber in the outer periphery of said wall or proximate thereto.

In order to insure reliable actuation of the coupling, for example after extended idling also in the event when the ladling tube-outlet tube arrangement feeds the liquid during operation in the disconnected condition preferably from the level chamber to the supply chamber, a further development in accordance with the invention provides for the housing cover associated with the supply chamber being convex in its peripheral area with respect to the supply chamber in a manner that the diameter of the supply chamber is smaller than the diameter of the level chamber. If in accordance with a further feature of the invention the separating disk between the level chamber and the supply chamber is provided with flow passages adjacent its peripheral area, it is ascertained that in any event a minimum quantity of fluid is present in the level chamber so that emptying of the level chamber cannot occur.

The flow passages are advantageously proportioned in a manner that their flow capacity is smaller than the ladling tube capacity. In this manner it is avoided that when the coupling is inactivated the flow of the fluid from the supply space to the level space through the equalizing bores takes place more rapidly than the ladling out by the ladling tube.

In a particularly advantageous form of construction of the embodiment described the ladling tube and the outlet are disposed in a common plane. Here the radial length of the ladling tube in relation to the regulating or control bar is smaller than the radial length of the outlet.

BRIEF DESCRIPTION OF THE DRAWINGS

Further details and features of the invention as well as the advantages thereof will become apparent from the drawings, which illustrate different embodiments without limiting the invention thereto and in which.

DESCRIPTION OF PREFERRED EMBODIMENTS OF THE INVENTION

Figure 1:
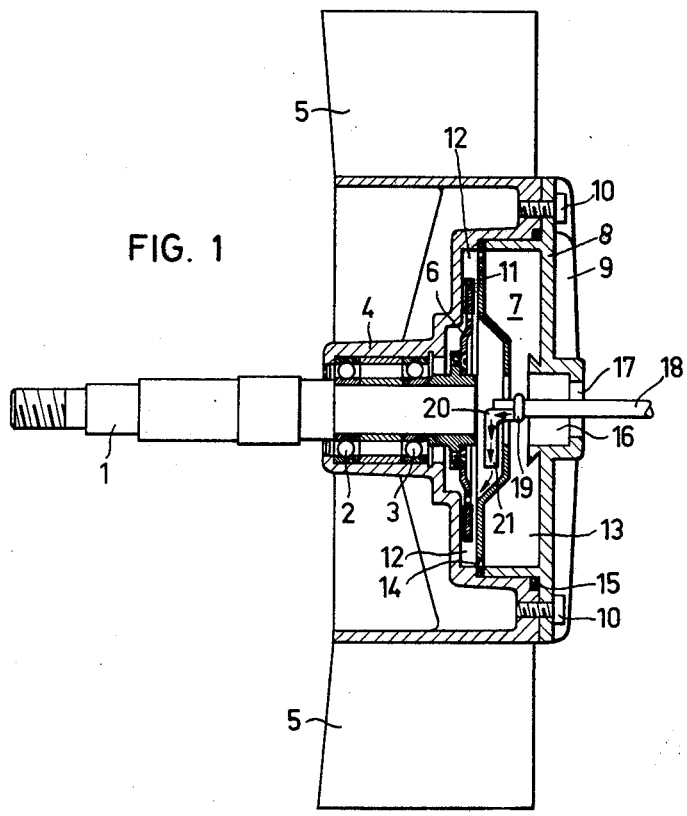
FIG. 1 is a side view of a first embodiment, partly in section.

A clutch or coupling casing 4 having secured thereto fans 5 is mounted in a known manner by means of ball bearings 2 and 3 on a drive shaft 1. The drive shaft 1 furthermore has secured thereto a primary disk or drive disk 6. The coupling chamber 7 defined by the clutch body 4 in the region of the drive disk 6 is closed by a cover 8 having cooling fans or ribs 9. The cover 8 is connected with the clutch body 4 by means of screws 10. The clutch chamber 7 is subdivided by a separating disk 11 into a work chamber 12 and a supply chamber 13. The separating disk 11 has feed-back bores 14 proximate its periphery. Between the clutch body 4 and the cover 8 a gasket 15 is provided in a known manner.

The cover 8 has an aperture 17 at its central area 16 in which a control bar 18 is displaceably mounted which is in communication with an outlet 21 through an axial duct 20. This bar 18 may be in the form of a rod connected to a thermostatic control device 42 which responds to the temperature of the cooling agent for the engine. The drive disk 6 is driven either directly by the drive shaft 1 of the internal combustion engine or by suitable transmission means. The fluid 22 in the work chamber 12 causes the casing 4 which is rotatably mounted on shaft 1 with the cover 8 and the fan blades 5 to be carried along. Depending on the quantity of the liquid in the work chamber 12 a desired relationship can be established between the drive speed and the number of rotations of the ventilator. The control fluid quantity or filling is ffected in accordance with the invention by the displaceable ladling tube 19.

Figure 2:
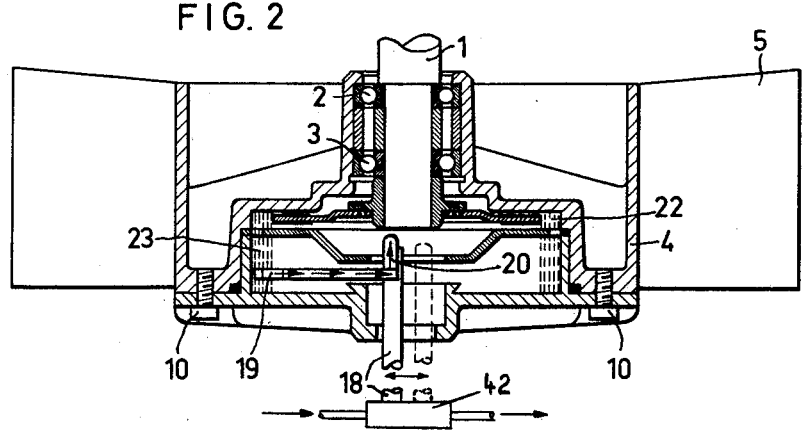
FIG. 2 is a cross section of the arrangement in accordance with FIG. 1.

In FIG. 2 the ladling tube 19 is illustrated in connected condition, while the dashed lines indicate the disconnected position. In the connected position the ladling tube scoops liquid by way of the central duct 20 into the outlet 21 out of the film of liquid 23 formed at the circumference of the supply chamber by the rotation and centrifugal force effects caused thereby. The liquid moves from the outlet along the concavely formed intermediate wall into the actual work chamber in which the drive disk 6 rotates.

As soon as the ladling tube 19 is displaced to the right as indicated in FIG. 2, the liquid level between the work chamber 12 and the supply chamber 13 equalizes by way of the return flow bores 14. Owing to this the working surface on the drive disk 6 which is supplied with fluid is reduced to such an extent that the ventilator seated on the clutch body 4 continues to run at a lower number of revolutions with respect to the drive shaft 1.

Figure 3:
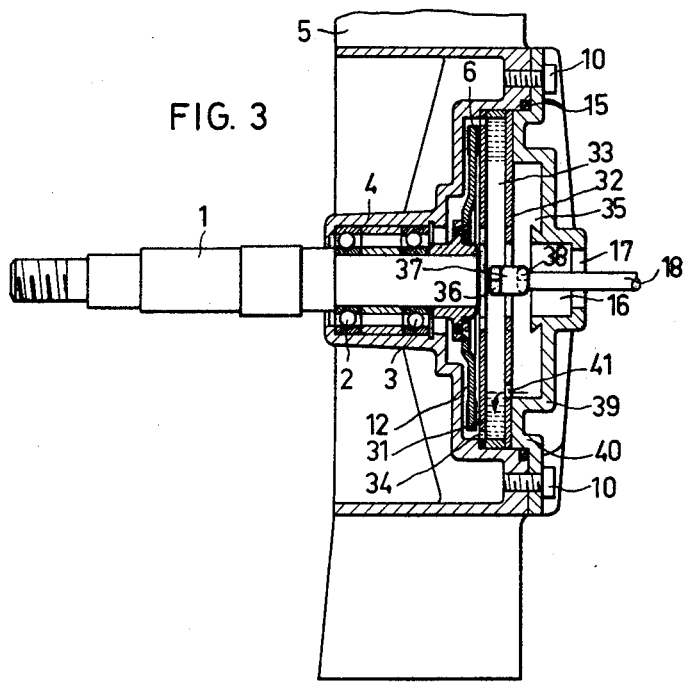
FIG. 3 is a partially sectional side view of a different embodiment of the invention.
Figure 4A:
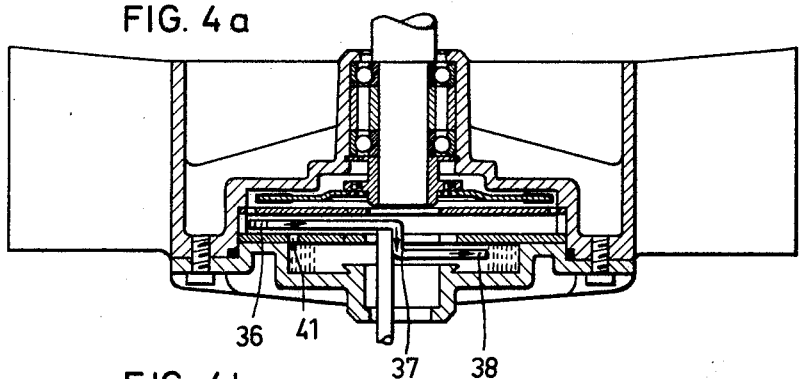
FIG. 4a is a cross section of the embodiment in accordance with FIG. 3 in disconnected condition.
Figure 4B:
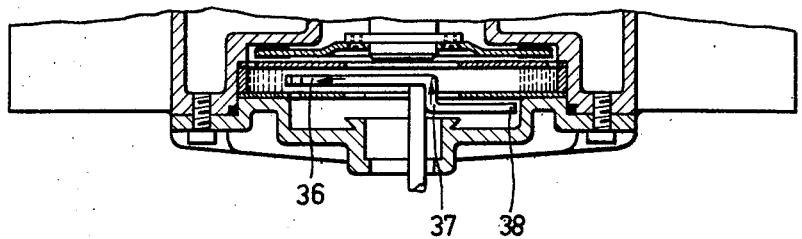
FIG. 4b is a section corresponding to FIG. 4a in connected condition.

In the embodiment in accordance with FIGS 3, 4a and 4b equal parts are designated by equal reference numerals corresponding to those of FIGS. 1 and 2. In the embodiment of the invention illustrated in FIG. 3 the supply chamber is separated from the work chamber by a separating disk 31. The separating disk 31 again is provided with return flow bores 34 along its peripheral area. The supply chamber again is subdivided by an additional separating disk or wall 32 into a level chamber 33 and the actual supply chamber 35. A ladling or scoop tube 36 extends into the level chamber 33 and is connected by way of axial section 37 with the outlet 38. The housing cover 39 which is connected by way of screws 10 with the clutch body 4 is provided at the circumferential area with a shoulder portion 40 in a manner that the supply chamber has a smaller diameter than the level chamber 33. The spacing wall 32 is provided at its circumferential portion with fluid flow passages 41 which serve as connecting safeguard or protection.

FIG. 4a shows the clutch in accordance with FIG. 3 in disconnected position. Here the ladling tube 36 takes fluid from the fluid layers in the level chamber 33 and scoops this fluid in the direction of the arrow into the supply chamber 35. The fluid can flow back from the work chamber to the level chamber 33 by way of the equalizing bore or return flow bores 34 so that the speed of the ventilator is reduced.

In the connected position in accordance with FIG. 4b, fluid is supplied from the level chamber in reverse direction through the outlet 38 which acts as the inlet by way of the central conduit 37 to the ladling tube 36, so that the fluid level in the level chamber 33 rises. As a result the fluid quantity in the work chamber increases so that the speed of rotation increases. By suitable proportioning of the apertures 34 the increase of the number of rotations carried along can be adjusted as desired.

In order to prevent emptying of the level chamber 33 in the disconnected condition through the ladling tube 36 fluid flow passages 41 are provided in the spacing wall 32 which safeguard the minimum level in the level chamber 33 and thus also in the work chamber 12.

The control bar 18 can be guided by a setting member known per se in dependence on a reference quantity, for example, the temperature of the motor or also the outside temperature, or in fluid cooled internal combustion engines the temperature of the cooling agent, i.e., it can be readily displaced. The control of the ventilator speed is effected in all embodiments of the invention merely by the dosing of the fluid content in the work chamber. The difference in the number of revolutions between the work chamber and the supply chamber is obtained by a stowing or banking effect whereby the fluid is forced into the supply chamber. This causes a circulating flow of fluid which leads by way of the work chamber, the supply chamber and thence by way of the ladling tube back into the work chamber.

By virtue of the construction of the control means in accordance with the invention the wear phenomena of the compression spring that are possible with variable control become insignificant. Also, disturbing effects due to leakage of the ventilator plate or the like cannot develop.

The invention is not limited to the illustrated and/or described features, but it also encompasses advantageous further developments within the scope of the knowledge of the man skilled in the art, and it also encompasses all partial and sub-combinations of the described and/or illustrated features.

Having now described our invention with reference to the embodiments illustrated in the drawings, what we desire to protect by Letters Patent of the United States is set forth in the appended claims.

We claim:
1. Ventilator arrangement particularly for cooling apparatus of internal combustion engines of automotive vehicles or the like having a fluid clutch or coupling, comprising a clutch housing having a cover provided with a central aperture and fan blades extending radially from said housing, a coupling or drive disk mounted on a shaft and rotatable in said housing, wherein torque is transmitted by a fluid, a separating disk mounted in said housing and defining a work chamber and a supply chamber, said disk having apertures permitting the flow of fluid, a ladling tube disposed in said supply chamber and movable radially with respect thereto, a discharge tube, a central duct connecting said ladling tube and said discharge tube as a unit and a control bar connected to said unit and extending through said central aperture.

2. Ventilator arrangement in accordance with claim 1, comprising an adjusting bar for said ladling tube and a temperature actuated control device operative in response to the cooling means of the engine, said bar being connected to said ladling tube and to said control device.

3. Ventilator arrangement in accordance with claim 1, where the center portion of said separating disk is concave with respect to said work chamber.

4. Ventilator arrangement in accordance with claim 1, where said apertures for fluid flow are provided proximate the periphery of said separating disk.

5. Ventilator arrangement in accordance with claim 1, where said ladling tube and said discharge tube are arranged in planes disposed at an angle of approximately 90° relative to one another.

6. Ventilator arrangement in accordance with claim 5, where the axis of said ladling tube extends generally perpendicularly with respect to the axis of said shaft.

7. Ventilator arrangement in accordance with claim 5, where the outlet of said discharge tube is disposed in a plane parallel to the axis of the ventilator.

8. Ventilator arrangement in accordance with claim 2, where the radial length of said ladling tube is smaller in relation to said adjusting bar than the radial length of said discharge tube.

9. Ventilator arrangement particularly for cooling apparatus of internal combustion engines of automotive vehicles or the like having a fluid clutch or coupling, comprising a clutch housing having a cover provided with a central aperture and fan blades extending radially from said housing, a coupling or drive disk mounted on a shaft and rotatable in said housing, wherein torque is transmitted by a fluid, a separating disk mounted in said housing and defining a work chamber and a supply chamber, said disk having apertures permitting the flow of fluid, a ladling tube disposed in said supply chamber and movable radially with respect thereto, a discharge tube, a central duct connecting said ladling tube and said discharge tube as a unit and a control bar connected to said unit and extending through said central aperture, and a spacing wall dividing said supply chamber into a level chamber and an actual supply chamber, said ladling tube being disposed in said level chamber and said discharge tube in said actual supply chamber.

10. Ventilator arrangement in accordance with claim 9, where said separating disk between said level chamber and said work chamber is provided with level balancing bores proximate the periphery thereof.

11. Ventilator arrangement in accordance with claim 9, where said housing cover proximate said supply chamber is convex with respect to said supply chamber in a manner that the diameter of the supply chamber is smaller than the diameter of the level chamber.

12. Ventilator arrangement in accordance with claim 9 where the spacing wall between the level chamber and the supply chamber is provided with fluid flow apertures proximate the periphery thereof.

13. Ventilator arrangement in accordance with claim 12, where said fluid flow apertures are so proportioned that the flow capacity is smaller than the capacity of the ladling tube.

14. Ventilator arrangement in accordance with claim 9, where said ladling tube and said outlet are disposed in a common plane.

References Cited

UNITED STATES PATENTS

| 2,210,416 | 8/1940 | Kiep et al. |
| 2,289,440 | 7/1942 | Kugel. |
| 2,256,258 | 9/1941 | Flickinger. |
| 3,174,600 | 3/1965 | Oldberg. |
| 3,179,221 | 4/1965 | Weir _____ 123—41.12 X |
| 3,215,235 | 11/1965 | Kamm. |

BENJAMIN W. WYCHE III, Primary Examiner

U.S. Cl. X.R.

192—58, 82; 230—271; 236—35